US012081983B2

(12) United States Patent
Peres et al.

(10) Patent No.: US 12,081,983 B2
(45) Date of Patent: Sep. 3, 2024

(54) SYSTEM, METHOD, AND PROGRAM FOR CONTROLLING ACCESS TO A MACHINE OR EQUIPMENT

(71) Applicant: HERC RENTALS INC., Bonita Springs, FL (US)

(72) Inventors: Tamir Peres, Bonita Springs, FL (US); Sunil Gupta, Naples, FL (US); Vanessa Layson, Bonita Springs, FL (US); Suraj Pandya, Naples, FL (US)

(73) Assignee: HERC RENTALS INC., Bonita Springs, FL (US)

( * ) Notice: Subject to any disclaimer, the term of this patent is extended or adjusted under 35 U.S.C. 154(b) by 191 days.

(21) Appl. No.: 17/683,459

(22) Filed: Mar. 1, 2022

(65) Prior Publication Data

US 2023/0229994 A1    Jul. 20, 2023

Related U.S. Application Data

(60) Provisional application No. 63/299,868, filed on Jan. 14, 2022.

(51) Int. Cl.
*H04W 12/00* (2021.01)
*G06Q 10/0631* (2023.01)
(Continued)

(52) U.S. Cl.
CPC .... *H04W 12/08* (2013.01); *G06Q 10/063112* (2013.01); *H04W 12/06* (2013.01)

(58) Field of Classification Search
CPC .............. H04W 12/06; H04W 12/08; G06Q 10/063112
See application file for complete search history.

(56) References Cited

U.S. PATENT DOCUMENTS 8,630,747 B2    1/2014   Burcham et al.
8,731,155 B2    5/2014   Chesnutt
(Continued)

FOREIGN PATENT DOCUMENTS

CA    2906679 A1    9/2014
CA    2796941 C     8/2017
(Continued)

OTHER PUBLICATIONS

B. Vaidya and H. T. Mouftah, "Security for Shared Electric and Automated Mobility Services in Smart Cities," in IEEE Security & Privacy, vol. 19, No. 1, pp. 24-33, Jan.- Feb. 2021, doi: 10.1109/MSEC.2020.3013759. (Year: 2021).*

(Continued)

*Primary Examiner* — Matheus Ribeiro Stivaletti
(74) *Attorney, Agent, or Firm* — Ladas & Parry, LLP

(57) ABSTRACT

A system for controlling access to equipment. The system establishes that a user of a mobile device has authorization to access an equipment and generates an encrypted digital key. The system sends the encrypted digital key to the mobile device. The system also sends an encrypted corresponding digital key to a controlling unit of the equipment. When a distance between the mobile device and the controlling unit is within a threshold, and the encrypted digital key transmitted by the mobile device is authenticated by the encrypted corresponding key on the controlling unit, the controlling unit unlocks the equipment so that the user of the mobile device takes control of the equipment in accordance with terms and conditions as set forth in a contract for operating the equipment between the user and an owner of the system.

38 Claims, 8 Drawing Sheets

(51) Int. Cl.
*H04W 12/06* (2021.01)
*H04W 12/08* (2021.01)

(56) References Cited

U.S. PATENT DOCUMENTS

| | | | |
|---|---|---|---|
| 8,731,627 | B2 | 5/2014 | Inabathuni et al. |
| 9,062,617 | B2 | 6/2015 | Mauti, Jr. |
| 9,126,545 | B2 | 9/2015 | Ampunan et al. |
| 9,241,235 | B2 | 1/2016 | Santavicca |
| 9,306,924 | B2 | 4/2016 | Lehmann |
| 9,348,492 | B1 | 5/2016 | Penilla |
| 9,365,188 | B1 * | 6/2016 | Penilla .................. G06Q 30/00 |
| 9,489,832 | B2 | 11/2016 | Nair et al. |
| 9,894,526 | B2 | 2/2018 | Giraud et al. |
| 9,963,012 | B2 | 5/2018 | Stevanovic et al. |
| 10,783,792 | B1 | 9/2020 | Price et al. |
| 11,017,483 | B2 | 5/2021 | Sworski et al. |
| 2009/0219135 | A1 | 9/2009 | Harvey et al. |
| 2013/0194068 | A1 | 8/2013 | Monig |
| 2015/0161832 | A1 | 6/2015 | Esselink et al. |
| 2015/0348178 | A1 | 12/2015 | Taylor et al. |
| 2016/0217635 | A1 | 7/2016 | Pudar et al. |
| 2018/0091930 | A1 | 3/2018 | Jefferies |
| 2018/0186333 | A1 * | 7/2018 | Santiano ............... H04W 12/08 |
| 2019/0001926 | A1 * | 1/2019 | Arakawa ............... B60R 25/241 |
| 2020/0118201 | A1 * | 4/2020 | Kaneichi ............ G06Q 30/0645 |
| 2021/0075594 | A1 | 3/2021 | Hassani et al. |
| 2021/0300298 | A1 * | 9/2021 | Tucker .................... B60R 25/20 |
| 2023/0094085 | A1 * | 3/2023 | Kim ........................ H04L 63/10 340/5.7 |

FOREIGN PATENT DOCUMENTS

| | | |
|---|---|---|
| CN | 107077133 B | 8/2017 |
| CN | 108022145 A | 5/2018 |
| CN | 113094691 A | 7/2021 |
| DE | 102020125463 A1 | 4/2021 |
| GB | 2559159 A | 8/2018 |
| KR | 101300788 B1 | 9/2013 |
| RU | 163993 U1 | 8/2016 |

OTHER PUBLICATIONS

Khanh Tuan Le, Bluetooth® low energy and the automotive transformation, Sep. 2017, Texas Instruments, pp. 1-10.
How to Use BLE with the FOX3-3G-BLE Device, Oct. 2019, Lantronix, Inc., pp. 1-15.
App replaces physical keys for on-demand vehicle access, Mar. 24, 2020, Auto Rental News, pp. 1-14.
Canadian Office Action for Application No. 3156398, dated Mar. 30, 2023, 6 pages.
Canadian Office Action for Application No. 3156398, dated Aug. 18, 2023, 5 pages.
Click and collect construction equipment rental app from https://irdeto.com/keystone-industrial/construction-equipment/contactless-mobile-app/, retrieved Jul. 12, 2023 from https://web.archive.org/web/20201025224137/https://irdeto.com/keystone-industrial/construction-equipment/contactless-mobile-app/, dated Oct. 25, 2020, 8 pages.
BTAPP Mobile application from https://teltonika-gps.com/product/btapp-mobile-application/ retrieved Jul. 12, 2023 from https://web.archive.org/web/20201001040337/https://teltonika-gps.com/product/btapp-mobile-application/ dated Oct. 1, 2020, 12 pages.
Perfectly keyless from https://www.bosch-mobility-solutions.com/en/solutions/software-and-services/perfectly-keyless/ retrieved Jul. 12, 2023 from https://web.archive.org/web/20210601000000*/https://www.bosch-mobility-solutions.com/en/solutions/software-and-services/perfectly-keyless/ dated Jun. 1, 2021, 8 pages.
Upgrade your telematics system with mobile Bluetooth connectivity from https://squarell.com/en/2020/03/upgrade-your-telematics-system-with-mobile-bluetooth-connectivity/ retrieved Jul. 12, 2023 from https://web.archive.org/web/20200804232813/https://squarell.com/en/2020/03/upgrade-your-telematics-system-with-mobile-bluetooth-connectivity/ dated Aug. 4, 2020, 8 pages.
Canadian Office Action corresponding to Application No. 3, 156,398, dated Dec. 29, 2023.
Office action from corresponding Canadian Patent Application No. 3, 156,398 dated Mar. 1, 2024.
Notice of Allowance from corresponding Canadian Patent Application No. 3,156,398 dated May 8, 2024.

* cited by examiner

1000

1100 The backend server grants access to a piece of equipment and then generates and sends a digital key to the mobile device, and also sends a corresponding digital key to the telematics device of the equipment if the equipment has not been assigned the digital key before, for each piece of equipment the user of the mobile device is authorized to access.

1200 Mobile device displays a list of available equipment the user is allowed to operate when the user is in range.

1300 User selects a piece of equipment from the list.

1400 The mobile device establishes a Bluetooth connection with the telematics device of the equipment and sends the digital key to the telematics device.

1500 Telematics device matches the digital key and grants the user access to the equipment if the keys match.

1600 Telematics device terminates user's access to the equipment when the digital key expires.

FIG. 2

SYSTEM, METHOD, AND PROGRAM FOR CONTROLLING ACCESS TO A MACHINE OR EQUIPMENT

CROSS-REFERENCE TO RELATED APPLICATION

This application claims the benefit of U.S. Provisional Patent Application Ser. No. 63/299,868 filed on Jan. 14, 2022, the entire contents of which are incorporated herein by reference.

TECHNICAL FIELD

The present application relates to the technical field of controlling or managing access to machines or equipment, and more particularly relates to controlling or managing local access to machines or equipment by a computer system and/or a mobile device.

BACKGROUND

In a conventional scenario, an enterprise (referred to for example as Company A) owns or controls an inventory of equipment of certain types (e.g., generators, air compressors, tractors, pumps, aerial equipment, masonry equipment, vehicles, and many more). Each piece of equipment is equipped with an access control unit, for example a telematics device, that is capable of communicating with a computer system or backend server of Company A. Another enterprise (referred to as Company B) rents equipment from Company A for its operations. If Company A agrees to rent a piece of equipment to Company B (e.g., by signing a contract or agreeing upon certain conditions), the backend server of Company A assigns a passcode to an operator of Company B who has been verified to have proper credentials to operate the equipment. The operator approaches the equipment and manually enters the passcode via a keypad. The telematics device on the equipment connects to the backend server via a wireless telecommunication network and verifies the passcode. After the passcode is verified, the telematics device unlocks the equipment for the operator to use.

One of the drawbacks to such a mode of operation is that if an operator wants to use the equipment, the telematics device on the equipment must be able to connect to the backend server to verify the passcode. If the equipment is located in an area where the wireless signal coverage is weak or absent (e.g., in a remote field, a radio signal-blocked warehouse, etc.), the passcode verification may not be successfully performed.

SUMMARY

The foregoing and other problems may be overcome by an improved system, method, and computer program product for local or mobile access management and control of machines, devices, or equipment. The mobile access control system utilizes a pair of keys generated by an asymmetric cryptology encryption method to verify the access, one key being stored on a mobile device and another key being stored on a telematics device that is attached to a piece of equipment. The pair of keys referred to herein as a digital key pair.

In one or more example embodiments of a local access control or mobile access control system, program, and method according to the present disclosure, a backend computer system or server, controlled by an entity that owns, manages, or rents machines or equipment, authorizes access to a piece of equipment by assigning an encrypted digital key to a mobile device of an operator. (As an example, a renting company having a rental agreement with the entity assigns operators to rented equipment. This information is communicated to the backend computer system or server and is what triggers encrypted digital key generation.) The backend server communicates with the mobile device via a wireless communication link (e.g., cellular or Wi-Fi) and sends the mobile device the encrypted digital key authorizing access to a selected piece of equipment. The backend server also sends via a telecommunication link (e.g., cellular or Wi-Fi) a corresponding encrypted digital key to an access control unit or telematics device of the selected equipment if the digital key has not been sent to the telematics device before (for example, if this is the first time the company is renting the piece of equipment and is being granted access to the piece of equipment). The operator uses the mobile device and the digital key to communicate with the access control unit or telematics device of the equipment via short-range communication such as Bluetooth™, so as to gain access to operate the equipment.

An application program (app) is installed in the mobile device. When the app is launched (most preferably the user must be authenticated to use the app and logged in), a list of equipment that are available to use and that the operator is allowed to operate is displayed on the mobile device. The list is continuously or at least periodically updated based on digital keys sent by the backend server and/or the app continuously scanning for equipment. The telematics devices on equipment is capable of broadcasting its availability. The list displayed on the mobile device can change dependent upon operator location Bluetooth range) and preferably a filter is applied that limits the displayed list to authorized equipment and/or available equipment. The operator makes a selection of the piece of equipment he/she wants to use and a digital key of the selected equipment is retrieved by the app.

A short-range communication connection, such as Bluetooth™, is established between the mobile device and the telematics device of the selected equipment when the two devices are close by or in range. The mobile device transmits the digital key to the telematics device. If the digital key transmitted by the mobile device matches the digital key of the equipment stored in the telematics device, the equipment is unlocked, whereby a "match" means that the digital key stored in the telematics device of the equipment validates the digital key transmitted by the mobile device.

The mobile device may receive and pre-store respective digital keys of all pieces of equipment that the user is allowed to use. Each particular piece of equipment has a digital key unique to that equipment. After making the selection among the pieces of equipment that are available to use, the mobile device sends an encrypted pre-stored digital key of the selected equipment to the telematics device of the selected equipment via the short-range communication connection. If the digital key stored in the telematics unit of the selected equipment validates the respective digital key, access is granted.

By virtue of the features of the disclosure, the only connectivity required to transmit data from the mobile device to the telematics device to unlock the equipment is the short-range communication link (e.g., Bluetooth™). Accordingly, access to the equipment can always be available once the telematics device has the digital key for the equipment and the mobile device has the matching digital key for the equipment, regardless of cellular or Wi-Fi connectivity. Therefore, even if cellular or Wi-Fi connectivity is unavailable (for example, the equipment is in an area that lacks such connectivity such as in a warehouse or under a roof), the operator can nevertheless gain access to the equipment. According to the disclosure, a piece of equipment does not need to communicate back to the backend server in order to enable access, as such dependence on cellular or Wi-Fi reception can be minimized or eliminated.

By virtue of these features, the telematics device receives a request by an operator via the operator's mobile device for access to and use of the equipment. Unauthorized access of the equipment is prevented by using a pair of digital keys that are loaded onto the telematics device and the mobile device, respectively, and the access to the equipment is granted once a match between the keys is verified.

BRIEF DESCRIPTION OF DRAWINGS

The features and advantages of the present disclosure will be more readily understood from a detailed description of exemplary embodiments taken in conjunction with the following figures:

FIG. 2 is an overview flowchart of controlling access to a machine or equipment according to one or more embodiments of the application;

The disclosure will next be described in connection with certain exemplary embodiments; however, it should be clear to those skilled in the art that various modifications, additions, and subtractions can be made without departing from the spirit or scope of the claims.

DETAILED DESCRIPTION

Figure 1:
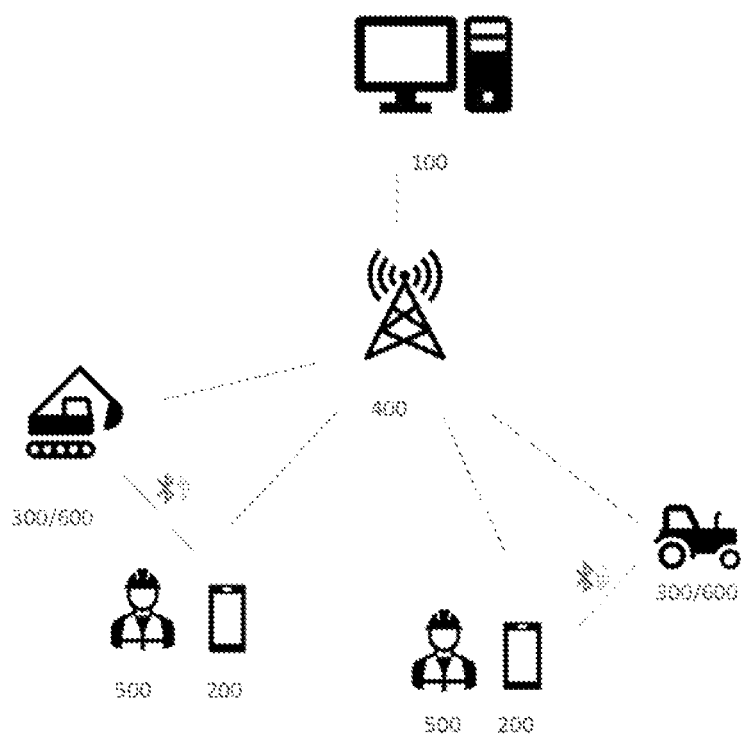
FIG. 1 is a schematic illustration of an equipment management network according to one or more embodiments of the application.

FIG. 1 is a schematic illustration of a rental equipment management network 10 according to one or more embodiments of the present application. As an initial matter it is noted that while one or more example embodiments are directed to equipment that is for rent and being managed by an equipment rental company, this disclosure is not limited to the rental setting, and of course could readily be applied to any ownership or control setting in which use of and access to equipment is being managed or controlled by an owning or controlling entity. For example, this disclosure may apply to any company, entity, or individual that owns, controls, or manages various units of equipment or machines and wishes to control use of or access to such machines or equipment by its own members or employees or by any other group or individual.

In FIG. 1, the rental equipment management network 10 includes a backend server or computer system 100, which may for example be operated by an equipment rental company to manage rental equipment owned or controlled by the rental company. The backend server 100 is configured to communicate with one or more mobile devices 200 through a wireless (e.g., cellular or Wi-Fi) communication network 400. Each of the mobile devices belongs to a user or operator 500, who may be for example an employee or contractor of a client company. The user 500 is granted rights to use or access various equipment owned or controlled by the rental company. The mobile device 200 is capable of communicating information with the backend server 100 by using for example a software application program (app) that is designed for rental operations. The backend server 100 is also capable of communication with one or more access control units or telematics devices 300. Each telematics device 300 is respectively coupled with one piece of equipment 600. The mobile device 200 is also capable of communication with the one or more telematics devices 300 via a short-range communication link (e.g. Bluetooth™ or the like).

FIG. 2 is an overall flowchart 1000 of controlling access to a machine or equipment according to one or more embodiments of the application.

1100: The backend server 100 grants access to a piece of equipment 600 (as authorized for example by an account administrator or software that registers users) and then generates and sends an encrypted digital key corresponding to the selected equipment to the mobile device 200. The backend server 100 also sends an encrypted digital key, which corresponds to the encrypted digital key sent to the mobile device 200, to a telematics device 300 of the equipment 600. Sending the digital key to the telematics device 300 is performed preferably only if the particular digital key has not been sent to the telematics device 300 before, or if the digital key has been updated.

The backend server 100 has a mobile access control platform that maintains and authenticates which company and user has permission to operate which equipment, and for how long (e.g., a predetermined time frame). The backend server 100 may store in a database information used to verify users and access. The verification may be in various aspects, including, but not limited to, verifying the user's identity, verifying the user's employment status with the client, verifying the user's license or permission to operate a type or types of machinery, verifying the client's rental contract with the equipment owner, verifying the client's credit status, etc.

The mobile access control platform may assign multiple operators to multiple groups for purposes of efficiency. Each group of operators are assigned the ability to access and operate certain pieces of equipment or certain types of equipment. By providing the encrypted digital keys of the certain pieces of equipment or certain categories of equipment to the operators of the group, the operators can have access to multiple pieces of equipment simultaneously. This enables the easy administration of the mobile access control. The account administrator can establish customized start and end dates by group, providing complete flexibility and customization to the management of access control. The account administrator can create, update and delete, operator assignment and access duration.

With a many-to-many association, the account administrator has the ability to toggle access control on/off on an account level and even at the specific equipment level. The administrator can conveniently enable authorization for multiple operators to multiple groups and grant access to certain categories or customized equipment list, thereby increasing productivity and efficiency. This feature enables the platform to provide a many to many relationship. This feature differentiates the mobile access control of the present application from other digital key systems which are mostly one operator to one piece of equipment. (For example, an administrator can create a custom group of all electricians and give all operators in that group access to all scissor lifts.)

The backend server 100 can be enabled (e.g., once permission is granted or once the equipment is in transport to the user site) to continuously or periodically transmit the respective digital keys to the mobile device and to the telematics device until the keys are received. The respective digital keys of all equipment the user is allowed to operate can be pre-stored in the mobile device 200. Likewise, the digital key of the equipment can be loaded onto the telematics device 300 of the equipment before the equipment 600 is transported.

This digital key transmitted to the mobile device 200 is a specific encrypted key or a digital encrypted two-part key. As commonly known, a digital key may be a cryptographic/digital encrypted string, and there is no limitation to what kind of digital key may be used in the present disclosure. For example the digital key could be hexadecimal numbers, a string of letters, numbers, or symbols, etc. A digital/digital key pair, one being stored in the telematics device 300 attached to the equipment 600, another being stored in the mobile device 200, must match in order to gain access to the equipment. "Match" means that the digital key validates the digital key. Thus the digital key can reside on the mobile device 200 and the corresponding digital key can reside on the telematics device 300 attached to the equipment 600 and the digital key partners with a string on the digital key to verify authentication.

The encrypted digital key can include information such as the operator's ID, the equipment's ID, start time and start date, end time and end date, etc. The encrypted digital key is sent by the backend server 100 to the mobile device 200 of the user.

1200: In order to obtain access to equipment 600 that the user is allowed to operate, the user 500 launches the app in the mobile device 200.

The mobile device 200 maintains and displays a list of machines or pieces of equipment that the user is permitted to use based on the respective digital keys sent to the mobile device 200 by the backend server 100 and that are available at the moment; the mobile device 200 scans to detect all equipment 600 in range and the mobile app then filters the list to display only the equipment 600 that the user 500 is allowed to use. The list of equipment may be dynamically generated based on the user's location, i.e., based on which pieces of equipment 600 are within short-range communication at that moment. The app can also be configured to show a list of all equipment for which authorization is granted even if out of short-range communication at the moment. A list of all authorized equipment may be broadcast to the mobile device 200 by the backend server 100 but the mobile device 200 and the app 255 can filter the list to display only authorized equipment 600 within short-range range communication. The mobile device 200 may scan for all equipment 600 around the user 500 that the user 500 may want to use.

1300: The user 500 uses the mobile app on the mobile device 200 to select an equipment or equipment type the operator is authorized to use. The user 500 is presented with an access screen. The selection may be made by the user 500 of the mobile device 200 from the list of equipment displayed on a touchscreen unit of the mobile device 200. Of course, the manner of making a selection is not limited to using a touchscreen unit and could be any suitable interface including but not limited to such a touchscreen unit or buttons, keys, voice, etc. In one or more example embodiments, the user 500 may be for example an employee or contractor of a client company that has signed a rental agreement with the owner or operator of the backend server 100. The backend server 100 controls a variety of machines or equipment that may be provided to the client according to the terms and conditions of the contract.

The user's identity and a list of equipment the user is permitted to use may be provided in one or more example embodiments by the user's employer, a rental customer, and pre-stored in a database of the backend server 100 of the equipment rental company. In the application program according to one or more embodiments, only the equipment types that the user 500 is permitted to use are displayed on the touchscreen, so that the user 500 may not select the type of equipment he/she is not permitted to use.

1400: When the distance between the mobile device 200 and the equipment 600 is within a threshold (e.g., 10 meters as a non-limiting example), the mobile device 200 establishes a short range wireless connection with the telematics device 300 of the equipment 600, and sends the encrypted digital key to the telematics device 300. The mobile device 299 securely transmits the key that has been received by the mobile device 200 to the telematics device 300 via the short-range communication link (e.g., Bluetooth or others).

1500: The telematics device 300 validates the digital key sent by the mobile device 200 by verifying a match or a signature of the digital key sent to the telematics device 300 by the mobile device 200 and the digital key sent to the telematics device 300 (or pre-stored or pre-loaded onto the telematics device 300) by the backend server 100.

Once the digital key is validated by the telematics device 300, the mobile device 200 is validated and the telematics device 300 allows the equipment 600 to be operated (e.g., unlocked or allowed to be powered on). At any point in the process the telematics device 390 can send an action message to the mobile app or to the backend server or computer system 100 advising of the status (e.g., unlocked, failed, locked) If access is not granted it may be because another user is operating the equipment, or due to a pairing error or a connection error, etc.

1600: Optionally, the digital key contains information such as validation period of the key. When the digital key expires, the telematics device 300 terminates the user's access to the equipment 600 and an appropriate message is displayed on the mobile device.

All the rental activities and equipment operations are monitored and controlled by the mobile access control platform in the backend server or computer system 100. The mobile access control collects usage data from the mobile device 200 and telematics device 300 and provides reporting and analytics functions at an operator level, Information that may be collected and reported include:

Information on which operator has used the equipment, on what dates and for how long, which provides the ability to do fractional billing;

Detailed usage, analytics, and data of single operator or a group of operators to the management team;

Information needed to manage multi-contractor jobsites and rental fleets;

Information enabling the administrator to view operators, groups, and operator assignment duration in real time, identifying who has access to what equipment, when and for how long.

By virtue of the features of the disclosure, the only connectivity required to transmit data from the mobile device 200 to the telematics device 300 to unlock the equipment 600 is short-range communication technology, e.g., Bluetooth or others. Accordingly, once the mobile device 200 has the digital key and the telematics device 300 has the digital key, access to the equipment 600 can always be available, regardless of cellular or Wi-Fi connectivity. Therefore, even if cellular or Wi-Fi connectivity is later unavailable (for example, the equipment or machine is in an area that lacks such connectivity such as in a warehouse or under a roof), the user 500 can nevertheless gain access to the equipment 600. According to the disclosure, once a piece of equipment 600 has the digital key, the piece of equipment 600 does not need to communicate with the backend server 100 in order to enable access; as such, dependence on cellular or Wi-Fi reception can be minimized or eliminated.

By virtue of these features, the telematics device 300 can receive a request by a user 500 or mobile device 200 for use and can prevent unauthorized use via a unique digital key pair that are loaded onto the telematics device 300 and the mobile device 200 respectively, in order to grant access to the equipment 600 once a match is verified or the digital key is validated. The keys can be generated on demand by the backend server 100 and stored on the mobile device 200 or the telematics device 300 respectively. The keys can be deleted after a user 500 is finished or a contract expires), or regenerated, to manage permission and access to equipment 600. Thus, the user 500 only needs credentials to log into the mobile device 300. The mobile app can be made available via e.g. a website, App Store, and Google Play, among other methods, and can be uploaded to the mobile device 200, and the user 500 or mobile app registered with proper credentials. Multiple users or mobile devices can be authorized to use equipment or equipment types but the system can be configured such that only one validated user can actually use a particular equipment at one time. For example, a customer can enable access control for their rentals to equipment via the mobile app and assign users via the web. If a user continues to operate the equipment after the predetermined time limit has expired, the backend server or computer system can terminate the user's access (e.g., disable the equipment at a safe time) or charge for the extra time.

In one or more embodiments, the digital key is generated by the backend server 100 on demand once the user 500 is verified. The digital key is transmitted to the mobile device 200. The user 500 authenticates himself or herself on the mobile device 200. The digital key is stored on the mobile device 200 for a configurable duration and it can be used during such duration online or offline without network connectivity. There is a unique digital key generated by the backend server 100 which is transmitted to the telematics device 300 located on a piece of equipment 600. The digital key on the telematics device 300 ultimately attempts to validate a digital key sent by a user's mobile device 200. A telematics device 300 does not need to hold a list of users and/or keys having access to the equipment 600. The telematics device 300 holds a digital key generated by the backend computer system 100 that will authenticate with the digital key that the user 500 has on the mobile device 200. There is no limit to the number of users that can receive valid digital keys to a particular piece of equipment. It can be provided that only one validated user 500 can use a particular piece of equipment 600 at one time. The duration of time that a digital key can reside on a mobile device 200 can be controlled.

Figure 3:
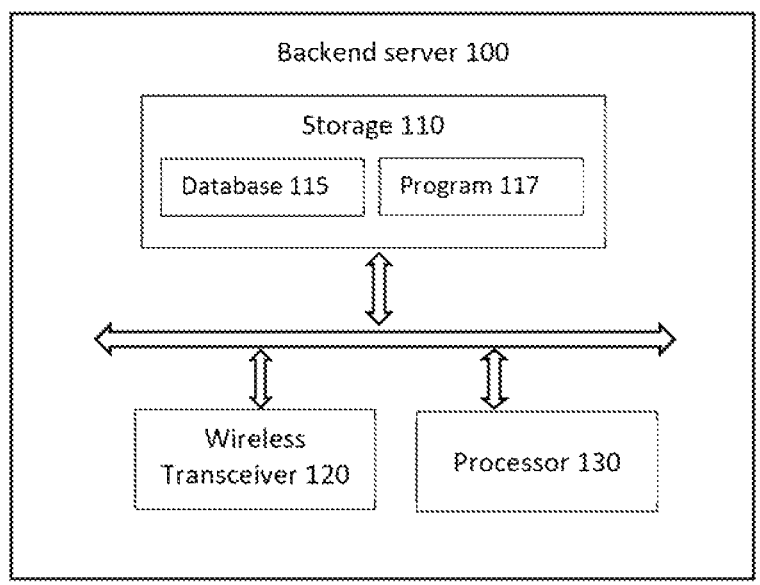
FIG. 3 is a schematic block diagram of a backend server for managing equipment access according to one or more embodiments of the application.

As shown in FIG. 3, the backend server 100 of the equipment rental company may be a regular computer server, or servers, or cloud services, etc. with purposely designed software for performing the management tasks. The backend server 100 includes storage 110 which hosts software program 117, and database 115. The storage 110 is connected with a wireless transceiver 120, and a processor or other hardware 130.

The storage 110 may be a local storage device such as a hard disk or flash memory, or it may be a cloud-based storage. There is no limit on what type of storage unit the backend server 100 may use. The database 115 includes information necessary for the equipment rental company (for example) to manage the rental equipment, such as information of all equipment for rent, information of clients, information of individual operators associated with each client, and accounting and contracting information. The storage 110 also stores operating system and software 117 of the backend server 100. The software program 117 particularly includes a software program purposely developed for controlling access to the equipment.

The term "transceiver" is a name given to a combination of a transmitter and a receiver. As commonly understood, the transmitter and the receiver may be integrated into one unit, or they may be separately implemented. There is no limit on what kind or configuration of transmitter, receiver, or transceiver may be used in the present disclosure. For the purpose of the present disclosure, preferably the transceiver 120 is capable of sending and receiving wireless communication signals through the wireless communication network 400 in accordance with one or more wireless telecommunication network protocols such as but not limited to wireless local area network (WLAN), long-term evolution (LTE) cellular network, and fifth-generation (5G) New Radio network.

"Processor" is a generic term collectively referring to certain components of the backend server 100 that have signal or data processing capabilities. As commonly understood, a computer system may have a number of components that have processing functions, such as central processing unit (CPU), graphics processing unit (GPU), application specific integrated circuit (ASIC), signal converters, and so on. For the purpose of the present disclosure, there is no limit to what kind of hardware component is being used as the processor 130.

Figure 4:
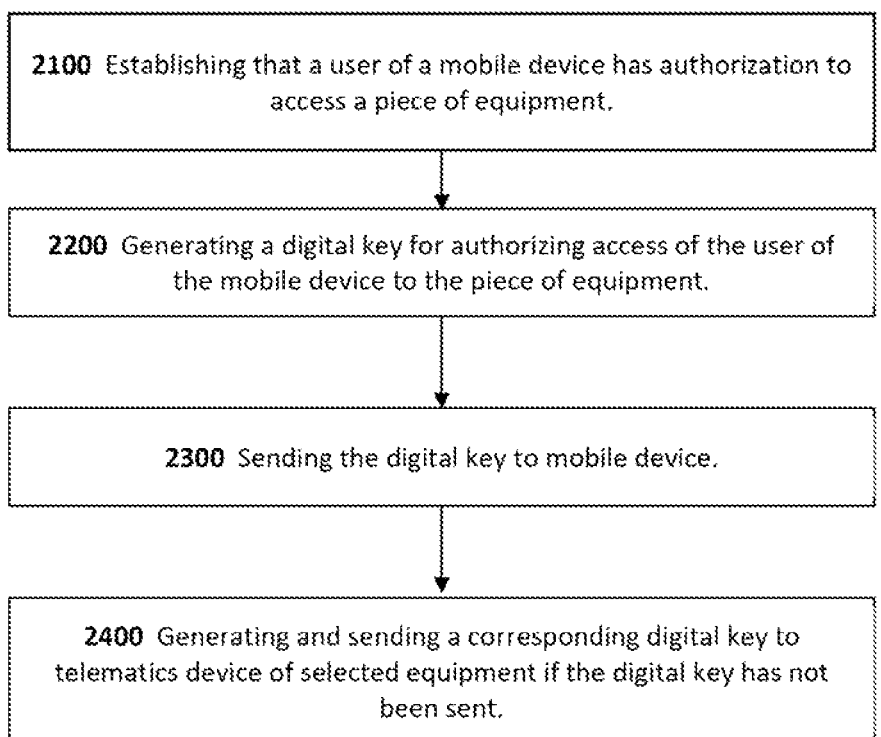
FIG. 4 is a flowchart of a process by the backend server for managing equipment access according to one or more embodiments of the application.

For managing the equipment 600, the backend server 100 is configured to perform a process 2000 that includes the following operations as shown in FIG. 4.

2100: Establishing that a user 500 of a mobile device 200 has access to a piece of equipment 600. The backend server 100 may provide the mobile device 200 with respective digital keys and information to enable the mobile device 200 to maintain a list of machines or equipment 600 that the user 500 is permitted to use and that are available at the moment. The list of equipment 600 may be dynamically generated by the mobile device 200 based on the user's location and which authorized equipment is within a certain range.

2200: Generating on demand an encrypted digital key for authorizing access of the user 500 of the mobile device 200 to the piece of equipment 600.

2300: Sending the encrypted digital key to the mobile device 200 of the user 500.

In one or more embodiments, the encrypted digital key may be sent to the mobile device 200 through the wireless communication link (cellular or Wi-Fi). In one or more embodiments, the encrypted digital key may be sent through a LAN or wireless/wired network, via e-mail, SMS, text, and others.

The digital key may be a randomly generated key that is unique to the equipment 600. Further, it can be specified that the digital key may only be used by the user 500 of mobile device 200, and not by any other devices or other users.

The digital key may be generated by the backend server 100 according to information related to the rental event by using a transformation algorithm; i.e., the key can be deciphered to reveal the information related to the rental event. The digital key is to be validated by a digital key held by the telematics unit 300.

2400: The backend server 100 generates and sends an encrypted digital key corresponding to the above digital key to an access control unit of the selected equipment 600. The access control unit may be part of the equipment itself or may be a telematics device 300 connected to, or in communication with, the equipment 600, In one or more embodiments, the digital key may be sent to the telematics device 300 through the wireless communication network, and the telematics device 300 stores the digital key in a cache or a memory. The digital key and the digital key form a pair of keys.

Sending the digital key to the telematics device 300 may be performed only if the digital key has not been sent to the telematics device before, or the digital key has been updated.

Figure 5:
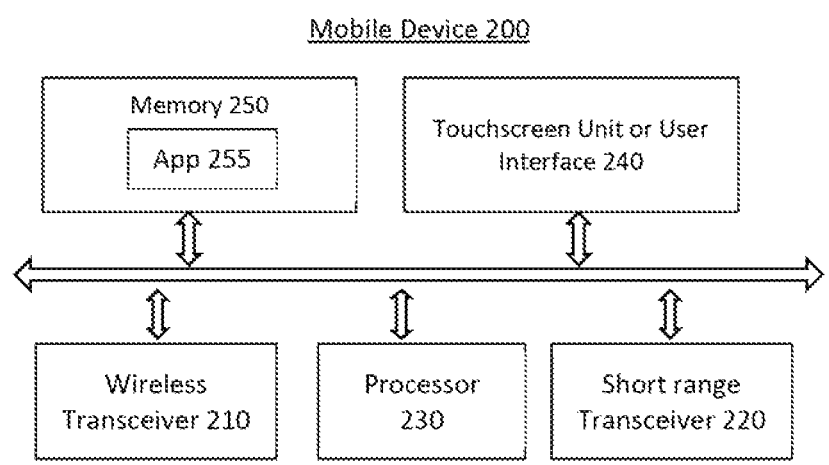
FIG. 5 is a schematic block diagram of a mobile device according to one or more embodiments of the application.

As shown in FIG. 5, a mobile device 200 according to one or more embodiments of the disclosure includes a wireless communication transceiver 210, a short-range radio communication interface or transceiver 220, a processor 230, an optional touchscreen unit 240 capable of displaying a graphics interface and receiving a user input, and a memory unit 250 configured to store an application program (app) 255 for the processor 230 to execute a process for accessing equipment. The mobile device 200 may be a Smartphone, a cellphone, a tablet computer, a handheld device, a laptop computer, etc., or any other type of mobile device that can be carried by a person or in a vehicle. There is no limitation on what kind of mobile device may be used in this disclosure.

Figure 6:
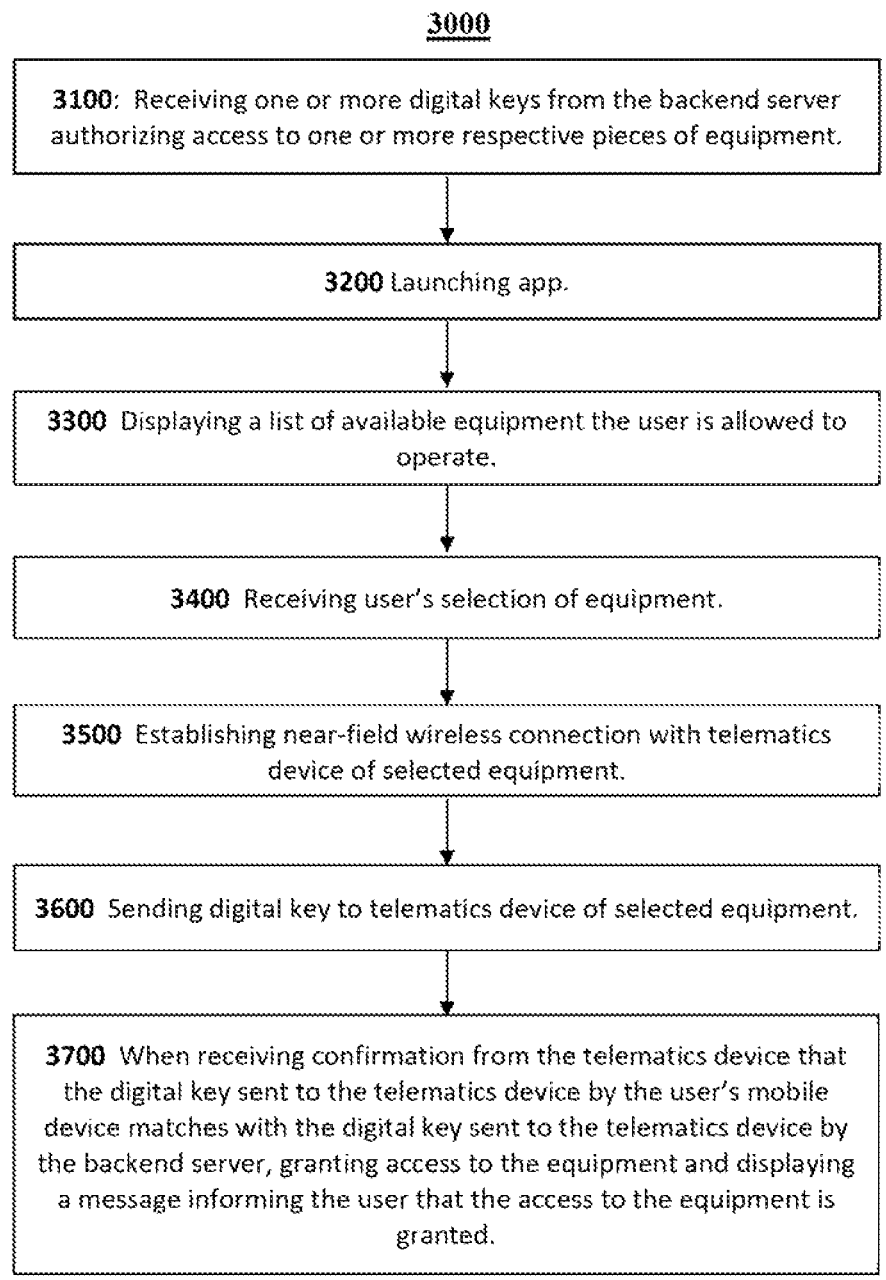
FIG. 6 is a flowchart of a process of a user using a mobile device to access equipment according to one or more embodiments of the application.

Shown in FIG. 6 is a process 3000 of accessing rental equipment by a user 500 using a mobile device 200 according to one or more embodiments of the present disclosure

3100: After the backend server 100 authorizes a user 500 of the mobile device 200 to use one or more pieces of equipment 600, the mobile device 200 receives one or more encrypted digital keys from the backend server 100 authorizing access to one or more respective pieces of equipment 600 and stores the one or more digital keys.

3200: To gain access of a piece of equipment, a user 500 of the mobile device 200 launches the app 255.

3300: The app 255 causes the touchscreen unit 240 to display a list of equipment 600 that is available and that the user 500 is permitted to operate. The equipment 600 on display belongs to the equipment rental company (for example) that operates the backend server 100, and the list of equipment can be generated by the app 255 based on digital keys and information provided to the mobile device 200 by the backend server 100 according to user's credentials and availability of the equipment 600. The list may preferably display only authorized equipment that is within short-range communication but may also display authorized equipment that is out of short-range communication. As noted above a list of all authorized equipment may be broadcast to the mobile device 200 by the backend server 100 but the mobile device 200 and the app 255 can filter the list to display only authorized equipment 600 within short-range range communication. The mobile device 200 may scan for all equipment 600 the user 500 may want to use.

3400: The user 500 of the mobile device 200 receives the user's selection of equipment 600 from the equipment list displayed on the touchscreen display unit 255.

The user 500 approaches the equipment 600 with the mobile device 200. The backend server 100 has already sent a corresponding encrypted digital key to the telematics device 300 of the selected equipment 600 (or the telematics device 300 already has such key pre-stored or pre-loaded thereon).

3500: When a distance between the mobile device 200 and the equipment 600 is within a threshold, a short-range wireless connection is established between the mobile device 200 and the telematics device 300 of the equipment 600. The short-range wireless connection may be a wireless connection according to standards such as BLUETOOTH™, Wi-Fi, UWB, ZigBee, etc. Although not limited by particular numbers, the threshold for establishing a short-range wireless connection may be approximately 10 meters in just one example of many, however the threshold may also be greater or lesser. The manner for two devices to establish a short-range wireless connection is well known and not described herein.

3600: After the short-range connection between the mobile device 200 and the telematics device 300 of the selected equipment 600 has been established, the mobile device 200 transmits the encrypted digital key the mobile device 200 received from the backend server 100 to the telematics device 300. When the digital key transmitted to the telematics device 300 by the mobile device 200 matches the digital key stored in the telematics device 300, the telematics device 300 unlocks the equipment 600, so that the user 500 is permitted to operate the equipment 600 in accordance with terms and conditions displayed for example in the app.

As noted the digital key may be a key pre-stored in the telematics device 300 or pre-loaded therein or sent by the backend server 100. The digital key is unique to the equipment 600. Each respective piece of equipment 600 has a VIN, an IC number, or some unique ID that is stored by the backend server's database 115 and related to a respective digital key. Each respective piece of equipment 600 has a unique digital key unique to that piece of equipment 600. The backend server's database 115 records each and every digital key of the respective equipment 600. Alternatively, if the digital key has been transmitted to the telematics device 300 previously, there is no need to transmit the same digital key again. When the digital key is updated, a new digital key will be transmitted to the telematics device.

3700: Optionally: When receiving confirmation from the telematics device 300 that the digital key sent to the telematics device 300 by the user's mobile device 200 matches with a digital key stored on or sent to the telematics device 300 by the backend server 100, and therefore that access to the equipment 600 has been granted, the mobile device 200 displays on the touchscreen 240 a success message. Thus, the user 500 is notified that the access to the equipment 600 is granted.

Figure 7:
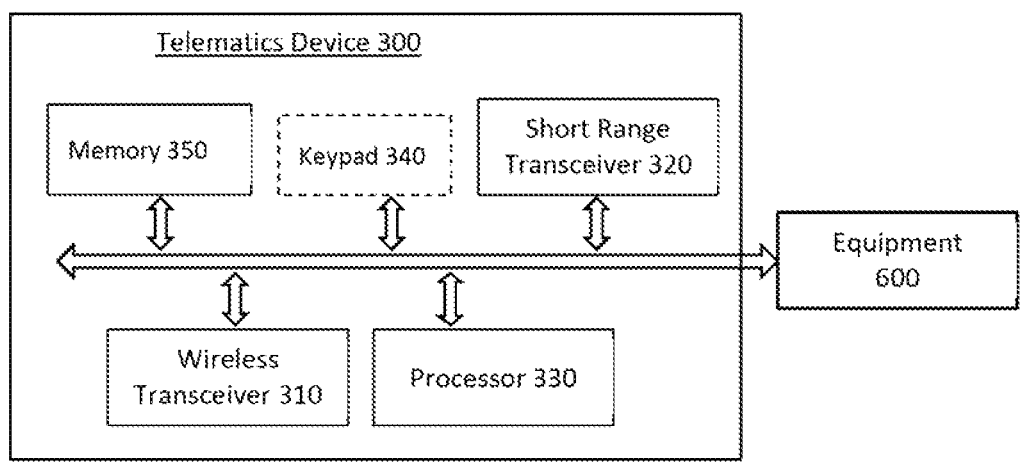
FIG. 7 is a schematic block diagram of a telematics device according to one or more embodiments of the application.

A structure of the telematics device 300 is shown in FIG. 7. As mentioned before, the telematics device 300 may be located on, connected to, or in communication with the equipment 600. The telematics device 300 may include a processor 330, a memory 350, a wireless transceiver 310, and a short-range radio transceiver 320. The telematics device 300 may further include a keypad 340 for manually entering a key if the wireless link is not working properly.

Figure 8:
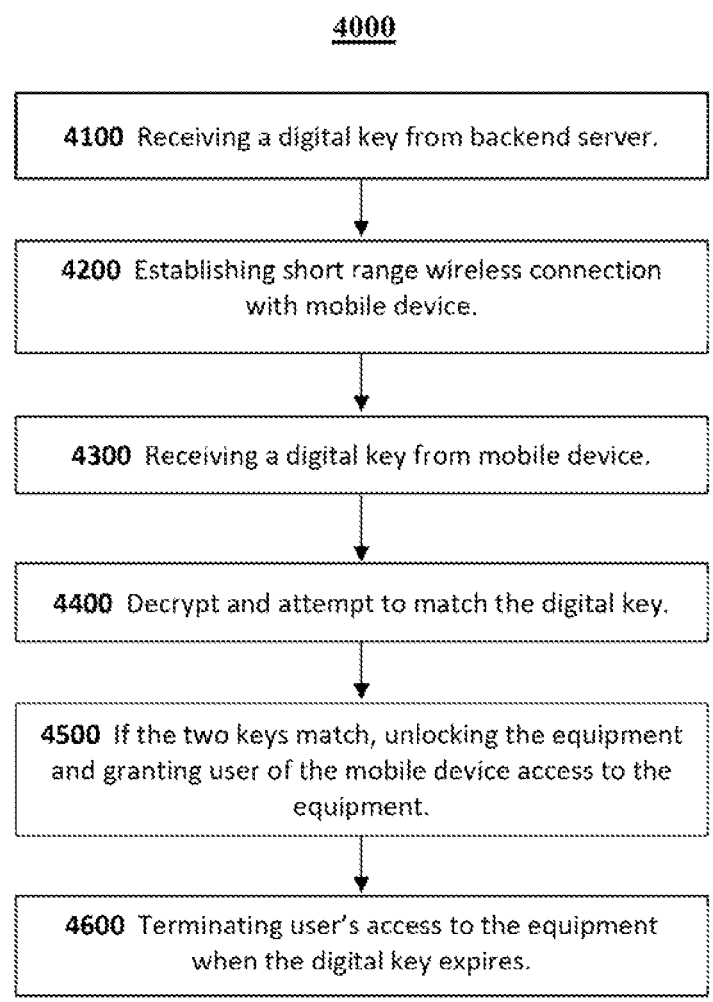
FIG. 8 is a flowchart of a process of a telematics device controlling access to equipment according to one or more embodiments of the application.

FIG. 8 is a flowchart of a process 4000 of a telematics device 309 controlling access to equipment according to one or more embodiments of the application. The process 4000 includes the follow steps:

4100: The telematics device 300 of selected piece of equipment 600 receives a unique digital key from backend server 100. This digital key may alternatively be pre-stored or pre-loaded. If the digital key has been sent to the telematics device 300 before and thus has already been stored thereon, there is no need to send the same digital key again for a new rental event (different user or different time).

4200: When the user 500 carrying a mobile device 200 is nearby, the telematics device 300 establishes a short range wireless connection (e.g. Bluetooth) with the mobile device 200.

4300: The telematics device 300 receives an encrypted digital key from the mobile device 200 via the short range communication link.

4400: The telematics device 300 decrypts the digital key and attempts to match the digital key with the stored digital key.

4500: If the two keys match, the telematics device 300 unlocks the equipment 600 and grants the user 500 of the mobile device 200 access to the equipment 600.

4600: Optionally, the telematics device 300 terminates the user's access to the equipment when the digital key expires.

It is especially advantageous in the present application that when the wireless network signal is weak or absent at the location where the equipment 600 is stored, the user 500 of the mobile device can still access the equipment 600 by using the short-range communication according to the features disclosed herein.

Another advantage is that the user 500 does not have to be assigned a password or passcode and does not have to manually log in to the equipment 600 via a keypad.

The technology of the disclosure, by virtue of its features, allows a user 500 to walk up to a piece of equipment with his or her phone or mobile device 200, and telematics device 300 automatically connects to the mobile device 209 via Bluetooth or similar short-range wireless communication means. This means that the mobile device 200 of a user 500 who has used his or her login credentials to access the mobile device 200 uses a mobile app 255 installed on the mobile device 200 to make a Bluetooth™ connection to a telematics device 300 on the equipment 600 to access the equipment 600 with the digital key.

One or more embodiments of the present application may be derived according to the above disclosure. For one example, if there are more than one of the same type of machine or equipment 600 in the lot, the pairing of the digital/digital key can ensure that only one piece of equipment 600 will be unlocked for a user's access. For another example, in case someone else has stolen or improperly acquired the mobile device 200 from the authenticated user 500, such person cannot unlock and operate the equipment 600 (option: confirming with finger ID or face ID). For yet another example, the usage and returning of the equipment 600 is recorded. Recording starts when the user 500 turns the power on, and ends when the user 500 returns the equipment 600 to the same lot; an invoke can be generated and sent to the mobile device 200 for the user's viewing and confirmation. Also, the equipment 600 may be tracked by Global Positioning System (GPS) technology or the like. If the user 500 takes the equipment 600 outside the allowed area, there can be a warning message on the mobile device 200. If after a preset time the equipment 600 is still outside the allowed area, the access to the equipment can be automatically disabled.

In one or more embodiments access to the equipment 600 can be provided until the rental contract ends; when that happens, both the digital key and the digital key are terminated or expire. Access can also be terminated for example upon misuse of the equipment 600 or if a dangerous condition exists.

In one or more embodiments the backend server 100 can send an update to the mobile device 200 once, periodically, occasionally, or continuously, the update containing a new digital key or information as to the status of existing digital keys corresponding to respective equipment 600.

In one or more embodiments if a user's mobile device 200 is close to an authorized equipment but is not being granted access, perhaps due to a system or other error, the user can request access via an alternate method such as e-mail, text, or any other suitable communication.

The present invention or any part(s) or function(s) thereof, including, e.g., the computer system or backend server 100, the mobile device 200, and the access control unit or telematics device 300 may be implemented using hardware, software, or a combination thereof, and may be implemented in one or more computer systems or other processing systems. A computer system for performing the operations of the present disclosure and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the disclosure using other computer systems and/or architectures.

The computer system can include a display interface that forwards graphics, text, and other data from the communication infrastructure (or from a frame buffer) for display on a display unit. The display interface can communicate with a browser. The computer system can also include a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. The removable storage unit can represent a floppy disk, magnetic tape, optical disk, etc. which is read by and written to by the removable storage drive. As will be appreciated, the removable storage unit can include a computer usable storage medium having stored therein computer software and/or data.

The computer system may also include a communications interlace which allows software and data to be transferred between the computer system and external devices. The terms "computer program medium" and "computer usable medium" are used to refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, cause the computer system or its processor to perform the features and functions of the present disclosure, as discussed herein, While various embodiments of the present disclosure have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above-described exemplary embodiments.

In addition, it should be understood that the Figures illustrated herein, which highlight the functionality and advantages of the present disclosure, are presented for example purposes only. The architecture of the present disclosure is sufficiently flexible and configurable, such that it may be utilized (and navigated) in ways other than that shown in the accompanying figures.

What is claimed is:

1. A computer system, comprising:
   a transceiver, a storage unit, and a processor;
   wherein the storage unit is configured to store a database of equipment and user information, and store instructions for controlling access to equipment controlled by the computer system;
   wherein the processor, by executing the instructions, is configured to:
     authorize access to the equipment based on the user information in the database; and
     generate an encrypted digital key after authenticating the user based on an input from the user, and an encrypted corresponding digital key that is different from the encrypted digital key to form a key pair, wherein the encrypted corresponding digital key is unique to the equipment;
   wherein the transceiver is configured to:
     send the encrypted digital key to a mobile device associated with the user; and
     send the encrypted corresponding digital key to a telematics device of the equipment in a case that the encrypted corresponding digital key has not already been sent to or pre-stored on the telematics device;
   wherein the encrypted corresponding digital key of the telematics device of the equipment is configured to validate the encrypted digital key sent to the mobile device for the mobile device to unlock the equipment remotely after the encrypted digital key is transmitted to the telematics device, and when the encrypted digital key is validated the equipment is unlocked.

2. The computer system of claim 1, wherein the equipment is configured to be operated by the user in accordance with terms and conditions displayed on the mobile device.

3. The computer system of claim 1, wherein the database is configured to store information of an identity of the user and types of equipment the user is permitted to operate.

4. The computer system of claim 3, wherein the processor is configured to:
   verify an identity of the user's employer;
   verify contract information of the user's employer; and
   verify information provided by the user's employer on the user's permission to operate the equipment.

5. The computer system of claim 1, wherein the processor is configured to:
   generate the encrypted digital key based on the user's identity and the type of equipment and duration the user is permitted to operate using a transformation algorithm.

6. The computer system of claim 1, wherein the transceiver is configured to:
   send the encrypted digital key to the mobile device through a wireless communication network.

7. The computer system of claim 1, wherein the transceiver is configured to:
   send the encrypted corresponding digital key to the telematics device of the equipment through a wireless communication network.

8. The computer system of claim 1, wherein the user is a group comprising one or more operators, and the processor is configured to generate a respective encrypted digital key for each of the one or more operators.

9. The computer system of claim 1, wherein
   one or more users are assigned to a group, the group having access to one or more pieces of equipment or equipment types,
   the processor, by executing the instructions, is configured to generate a respective encrypted digital key for each user in the group, and
   the transceiver is configured to send the respective encrypted digital key to one or more mobile devices associated with the one or more users in the group.

10. The computer system of claim 9, wherein each user is assigned to one or more groups.

11. The computer system of claim 9, wherein the processor is configured to update the group to add or remove one or more users, or to create or change a duration during which access to the one or more pieces of equipment or equipment types by the group is permitted.

12. The computer system of claim 9, wherein the one or more pieces of equipment or equipment types are each assigned a duration during which access by the group is permitted.

13. The computer system of claim 9, wherein the processor is configured to update the database of equipment and user information based on usage information received by the transceiver from the mobile device or the telematics device to reflect which users or groups currently have access to which equipment and/or equipment types and for which duration.

14. A computer-implemented method controlling access to equipment based on user information stored in a database, comprising:
   generating an encrypted digital key after authenticating the user based on an input from the user, and an encrypted corresponding digital key that is different from the encrypted digital key to form a key pair, wherein the encrypted corresponding digital key is unique to the equipment;
   sending the encrypted digital key to a mobile device associated with the user; and
   sending the encrypted corresponding digital key to a telematics device of the equipment in a case that the encrypted corresponding digital key has not already been sent to or pre-stored on the telematics device;
   wherein the encrypted corresponding digital key of the telematics device of the equipment is configured to validate the encrypted digital key sent to the mobile device for the mobile device to unlock the equipment remotely after the encrypted digital key is transmitted to the telematics device, and when the encrypted digital key is validated the equipment is unlocked.

15. The method of claim 14, wherein the equipment is configured to be operated in accordance with terms and conditions displayed on the mobile device.

16. The method of claim 14, wherein the database is configured to store information of an identity of the user and types of equipment the user is permitted to operate.

17. The method of claim 16, further comprising:
verifying an identity of the user's employer;
verifying contract information of the user's employer; and
verifying information provided by the user's employer on the user's permission to operate the equipment.

18. The method of claim 14, wherein the encrypted digital key is generated based on the user's identity and the type of equipment and duration the user is permitted to operate using a transformation algorithm.

19. The method of claim 14, wherein
the encrypted digital key is sent to the mobile device through a wireless communication network.

20. The method of claim 14, wherein
the encrypted corresponding digital key is sent to the telematics device of the equipment through a wireless communication network.

21. The method of claim 14, wherein the user is a group comprising one or more operators, and the method further comprises generating a respective encrypted digital key for each of the one or more operators.

22. The method of claim 14, further comprising:
assigning one or more users to a group, the group having access to one or more pieces of equipment or equipment types,
generating a respective encrypted digital key for each user in the group, and
sending the respective encrypted digital key to one or more mobile devices associated with the one or more users in the group.

23. The method of claim 22, wherein each user is assigned to one or more groups.

24. The method of claim 22, further comprising updating the group to add or remove one or more users, or to create or change a duration during which access to the one or more pieces of equipment or equipment types by the group is permitted.

25. The method of claim 22, further comprising assigning the one or more pieces of equipment or equipment types a duration during which access by the group is permitted.

26. The method of claim 22, further comprising updating the database of equipment and user information based on usage information received from the mobile device or the telematics device to reflect which users or groups currently have access to which equipment and/or equipment types and for which duration.

27. A mobile device, comprising:
a wireless communication transceiver;
a short-range radio communication interface;
a processor; and
a user interface capable of displaying a graphic interface and receiving a user input through touch or voice;
wherein the wireless communication transceiver is configured to:
receive one or more encrypted digital keys from a computer system authorizing access to one or more respective pieces of equipment, wherein the one or more encrypted digital keys are generated by the computer system after authenticating the user based on the input from the user;
wherein the processor is configured to:
launch an app displaying a list of the one or more pieces of equipment the user is authorized to access; and
receive a selection of equipment by the user of the mobile device;
wherein the short-range radio communication interface is configured to:
establish a connection with a telematics device of the selected equipment when a distance between the mobile device and the selected equipment is within a threshold; and
transmit one of the one or more encrypted digital keys to the telematics device;
wherein an encrypted corresponding digital key of the telematics device is configured to validate the encrypted digital key transmitted by the mobile device to the telematics device for the mobile device to unlock the selected equipment remotely, and when the encrypted digital key is validated the equipment is unlocked, wherein the encrypted corresponding digital key is different from the encrypted digital key to form a key pair with the encrypted digital key, and the encrypted corresponding digital key is unique to the equipment.

28. The mobile device of claim 27, wherein the connection between the mobile device and the telematics device of the selected equipment is a Bluetooth connection.

29. The mobile device of claim 27, wherein the user interface is further configured to:
display a confirmation from the telematics device that the user has been granted permission to operate the selected equipment.

30. The mobile device of claim 27, wherein the wireless communication transceiver is further configured to scan for equipment that is within range of the short-range radio communication interface, and the list is periodically or continuously updated based on the scan to display the one or more pieces of equipment the user is authorized to access that are within the range.

31. The mobile device of claim 27, wherein the one or more pieces of equipment contained in the list is based on information broadcast to the wireless communication transceiver by the computer system.

32. A method performed by a mobile device for accessing equipment controlled by a computer system, comprising:
receiving one or more encrypted digital keys from the computer system authorizing one or more respective pieces of equipment, wherein the one or more encrypted digital keys are generated by the computer system after authenticating a user based on an input from the user;
displaying a list of the one or more pieces of equipment on a touchscreen unit of the mobile device;
receiving a selection of equipment by the user of the mobile device through the touchscreen unit;
establishing a connection with a telematics device of the selected equipment on which is stored an encrypted corresponding digital key when a distance between the mobile device and the selected equipment is within a threshold; and
transmitting the encrypted digital key to the telematics device;
wherein the encrypted corresponding digital key of the telematics device is configured to validate the encrypted digital key transmitted by the mobile device to the telematics device for the mobile device to unlock the selected equipment remotely, and when the encrypted digital key is validated the equipment is unlocked, and wherein the encrypted corresponding digital key is different from the encrypted digital key to form a key pair with the encrypted digital key, and the encrypted corresponding digital key is unique to the selected equipment.

33. The method of claim 32, wherein the connection between the mobile device and the telematics device of the equipment is a Bluetooth connection, and the encrypted digital key is transmitted to the telematics device in response to an instruction to send the encrypted digital key received by the touchscreen unit.

34. The method of claim 32, further comprising:
displaying a confirmation from the telematics device that the user has been granted access to the selected equipment.

35. The method of claim 32, further comprising scanning for equipment that is within range of the short-range radio communication interface, and periodically or continuously updating the list based on the scanning to display the one or more pieces of equipment the user is authorized to access that are within the range.

36. The method of claim 32, wherein the one or more pieces of equipment contained in the list is based on information broadcast to the mobile device by the computer system.

37. A method performed by a telematics device for granting access to a corresponding equipment, the method comprising:

establishing a short-range wireless communication by the telematics device with a mobile device;

receiving by the telematics device an encrypted digital key from the mobile device, wherein the encrypted digital key is generated by a computer system after authenticating a user based on an input from the user;

receiving an encrypted corresponding digital key by the telematics device in a case that the encrypted corresponding digital key has not already been received or pre-stored on the telematics device;

wherein the encrypted corresponding digital key of the telematics device of the equipment is configured to validate the encrypted digital key sent to the mobile device for the mobile device to unlock the equipment remotely, and when the encrypted digital key is validated the equipment is unlocked, wherein the encrypted corresponding digital key is different from the encrypted digital key to form a key pair with the encrypted digital key, and the encrypted corresponding digital key is unique to the selected equipment.

38. The method of claim 37, further comprising decrypting the encrypted digital key received from the mobile device.

\* \* \* \* \*